Feb. 25, 1969  J. J. MAGYAR  3,429,153

VEHICLE BODY COMPARTMENT LATCH AND LOCK

Filed Sept. 20, 1967

INVENTOR.
Joseph J. Magyar
BY
D. L. Ellis
ATTORNEY

United States Patent Office 3,429,153
Patented Feb. 25, 1969

3,429,153
VEHICLE BODY COMPARTMENT LATCH AND LOCK
Joseph J. Magyar, Warren, Mich., assignor to General Motors Corporation, Detroit, Mich., a corporation of Delaware
Filed Sept. 20, 1967, Ser. No. 669,069
U.S. Cl. 70—84    4 Claims
Int. Cl. E05b 65/44, 63/12; E05c 3/12

ABSTRACT OF THE DISCLOSURE

A latch and lock assembly for a vehicle body glove compartment door includes a housing mounted on the instrument panel and rotatably carrying a forked bolt engageable by a keeper on the glove compartment door, with the housing also rotatably mounting a latch operating key-operable lock cylinder or plug having a cylindrical detenting surface portion engageable with the bolt to hold it in latched position, with a slot being provided in the detenting portion for permitting free rotation of the bolt and opening movement of the door when the cylinder is rotated to register the slot with the rotational plane of the bolt. Key-operated tumblers are provided to lock the cylinder against releasing rotation, and a coil torsion spring operates in two directions to bias the cylinder to a neutral or normal bolt detenting position from either its bolt releasing position or its locked position.

---

This invention relates to latches and more particularly to an improved latch and lock for a vehicle body compartment closure.

One feature of this invention is that it provides a new and improved latch and lock for a vehicle body compartment closure. Another feature of this invention is that it provides a new and improved vehicle body compartment closure latch and lock including a latch bolt rotatable between latched and unlatched positions, and a latch-operating key lock cylinder rotatable relative to the path of rotation of the bolt between latch detenting or latch releasing positions, with the operating cylinder being selectively lockable by a key against rotation to its latch releasing position. Another feature of this invention is that the latch bolt operating or detenting arrangement between the latch bolt and the operating cylinder is of highly efficient and economical construction wherein a bolt detenting portion of the operating cylinder is provided by a peripheral cylindrical surface thereof, with a slot being provided in such surface to serve for selective latch release when the operating cylinder is rotated to a position registering the slot with the fixed rotational path of the latch bolt. A further feature of the invention is in the provision of a coil torsion spring biasing the operating cylinder to a normal or neutral latch detenting position from either its latch releasing position or a third position wherein the cylinder is rotatably selectively locked against latch releasing rotation by key-operable tumbler means.

These and other features and advantages of the invention will be readily apparent from the following specification and drawing wherein.

Figure 1:
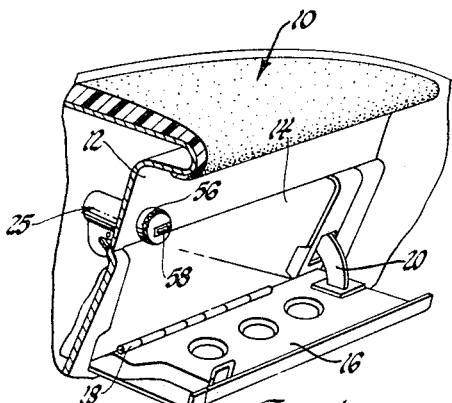
FIGURE 1 is a fragmentary perspective view of a vehicle body instrument panel structure including a glove compartment and a compartment closure latch and lock therefor according to this invention, the door and the latch and lock being shown in open and unlatched positions, respectively.
Figure 2:
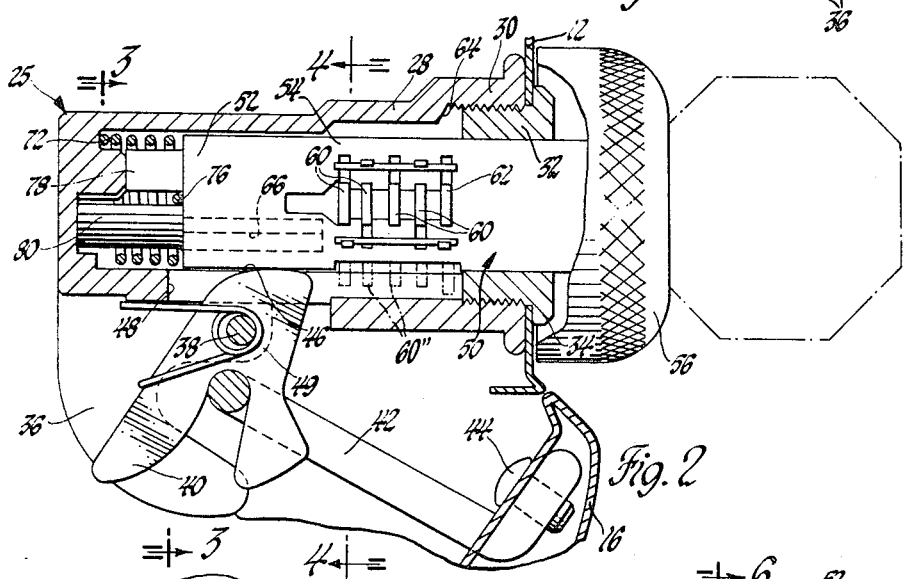
FIGURE 2 is an enlarged sectional view of the latch and lock structure with the latch and lock being shown in latched position and the door in closed position.

Referring now to FIGURE 1 of the drawing, the latch and lock structure of this invention is shown in an illustrative embodiment applied for use with the door of a glove compartment of a vehicle body. The vehicle body includes an instrument panel structure 10 including a face panel 12 having an opening therein to the glove compartment 14. The glove compartment door 16 is hinged adjacent its lower edge at 18 to the face panel 12 for movement between a generally horizontally disposed fully open position as shown, and a closed position as indicated in FIGURE 2. A limit strap 20 is provided on door 16 to limit opening movement of the door in known manner.

The latch and lock structure of this invention, designated generally as 25, includes a hollow housing 28 of generally cylindrical construction including an internally threaded end portion 30 receiving an externally threaded and shouldered retainer sleeve 32. The housing is located wholly interiorly of the face panel 12 and is firmly anchored thereto by tight threading of such sleeve 32 through a suitably located aperture in the panel and into the housing to cause the face panel to be gripped between the end flange of housing 28 and the annular external shoulder 34 of the sleeve. Adjacent its interior end the housing 28 includes a pair of downwardly extending spaced ears 36 having mounted therebetween a pin 38 rotatably carrying between the ears a forked latch bolt 40, as seen best in FIGURE 2. The forked portion of the bolt is cooperable with a generally U-shaped bar striker or keeper 42 which is bolted or otherwise secured as at 44 to the inner panel of the door 16. Bolt 40 includes a dentent shoulder 46 adapted to oscillate within a slot 48 provided in the housing 28 opening to the central bore thereof, when the latch bolt rotates between latched and unlatched positions. A coil torsion spring 49 winds about pin 38 to either side of the bolt and includes a central U-shaped portion bearing on a leg of the bolt and spaced end portions bearing on the housing to bias the bolt counterclockwise to its unlatched position, FIGURE 6.

A latch-operating lock cylinder or plug 50 of somewhat elongated configuration is rotatably mounted within the central bores of housing 28 and sleeve 32 and includes a latch operating portion 52 proximate its remote interior end, a locking portion 54 which houses conventional key-operable tumblers or the like, and a knurled manipulating head 56 located exteriorly of face panel 12. The head 56 may be integrally formed or a separate attached piece. In either case, the head is preferably constructed to shear from the remainder of the cylinder under a specified abnormal torque loading for theft-proofing purposes. The key-operable tumbler means in locking portion 54 may be of any desired conventional construction but are preferably of the wafer-type and spring-biased normally to an extended position absent the coded key therefor, and withdrawn to the cylinder portion 54 upon insertion of the key through the exterior key slot 58 in head 56. In the embodiment shown, only the interior four of the tumblers, designated 60, are operated by the key, the tumbler 62 nearest face panel 12 being extended even with the key inserted and somewhat longer than the tumblers 60 to serve for normal retention of cylinder 50 within housing 28 and sleeve 32. After installation of the housing and sleeve on face panel 12, bolt 40 is finger-rotated a proper amount clockwise generally to the position of FIGURE 2, and cylinder 50 with its key inserted is pushed into the sleeve and housing with the tumbler 62 being held down by a finger or suitable tool so as to enter the bore of sleeve 32 and remain depressed until cylinder 50 is properly axially located in the position shown. In such position, the spring-extended tumbler 62 merely oscillates within an enlarged chamber 64 of housing 28 in abutting relation with the inner end of sleeve 32.

Figure 3:
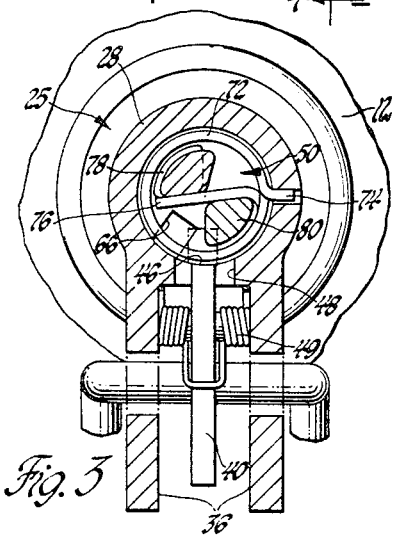
FIGURE 3 is a sectional view taken generally along the plane indicated by lines 3—3 of FIGURE 2.

Latch operating portion 52 of cylinder 50 has a smooth cylindrical surface over nearly its full circumference interrupted only by an enlongated axially extending slot 66. This cylindrically surfaced area of portion 52 serves as a detent element for bolt 40 in that it is disposed for interference therewith within the path of rotation of shoulder 46 from its latched position, as seen in FIGURES 2 and 3. Slot 66, however, is of a depth sufficient to permit rotation of shoulder 46 therethrough when the cylinder 50 is rotated to its latch releasing position registering the slot in the plane of rotation of the bolt. Assuming an original position of the parts as shown in FIGURE 2 with the door 16 closed and latched therein by bolt 40, finger rotation on head 56 in a clockwise direction in FIGURE 1, seen as a counterclockwise direction in FIGURE 3, rotates cylinder 50 from the latch detenting position shown wherein the bolt is held latched by the cylindrical detent surface of portion 52, to the latch releasing position of FIGURES 5 and 6 wherein bolt 40 is permitted to rotate counterclockwise to unlatched position and door 16 to open by reception of shoulder 46 within slot 66.

Figure 4:
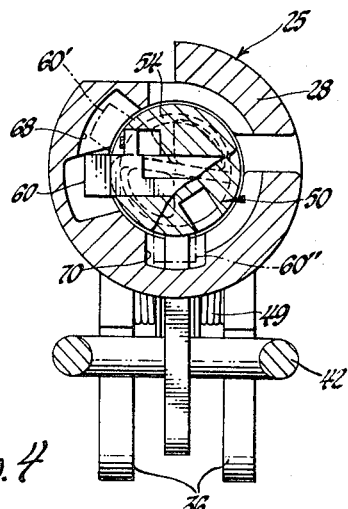
FIGURE 4 is a sectional view taken along the plane indicated by lines 4—4 of FIGURE 2.

Referring to FIGURE 4, the normally extended tumblers 60 are permitted limited oscillation within housing 28 during latch releasing rotation of cylinder 50 through provision of a freewheeling chamber 68 in the housing, the extent of travel between latch detenting and latch releasing positions of the cylinder being indicated by the numerals 60 and 60' respectively. Housing 28 is further provided with a locking chamber 70 for receiving the tumblers 60 and restraining the cylinder 50 in a locked position indicated as 60", displaced counterclockwise from the latch detenting position thereof, but still presenting to shoulder 46 its cylindrical detenting surface. Use of the coded key is, of course, required to withdraw the tumblers 60 before rotating cylinder 50 from the latch detenting position to such locked position. Subsequent withdrawal of the key extends the tumblers 60 to chamber 70 for locking the cylinder thusly until reinsertion of the key for unlocking.

Figure 6:
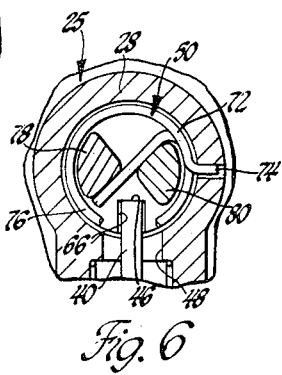
FIGURE 6 is a sectional view taken along the plane indicated by lines 6—6 of FIGURE 5.

Referring to FIGURES 2, 3 and 6, a coil torsion spring 72 has one end 74 thereof hooked within an aperture of housing 28 and includes an opposite transversely extending end 76 received between a pair of lugs 78 and 80 projecting from the interior end of cylinder 50. Spring 72 seeks a neutral unstressed position shown in FIGURE 3 locating cylinder 50 normally in latch detenting position and providing bias therein to such position from either the latch releasing position of the cylinder shown in FIGURE 6, or the oppositely rotatably displaced locked position. Counterclockwise rotation from the latch detenting position of FIGURE 3 to the latch releasing position resiliently winds spring 72, while a small degree of freewheeling clockwise rotation from the latch detenting position of FIGURE 3 moves opposite sides of lugs 78 and 80 into engagement with spring end 76 to effect limited resilient unwinding of the spring as the cylinder moves to locked position.

Figure 5:
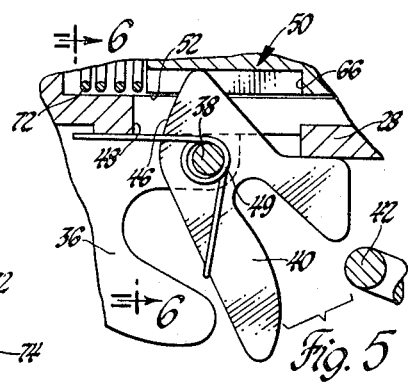
FIGURE 5 is a sectional view similar to a portion of FIGURE 2 showing the latch and lock in unlatched position.

Continuing the operational example and with the glove compartment door 16 now in an open position and bolt 40 in its unlatched position as shown in FIGURES 1, 5 and 6, closing movement of door 16 moves striker 42 into the forked portion of bolt 40 to begin clockwise rotation thereof from the unlatched position of FIGURE 5 toward the latched position of FIGURE 2. It is seen that with door 16 open and the counterclockwise bias on bolt 40 provided by spring 49, the cylinder 50 has been held in latch releasing position by shoulder 46 against the unwinding tendency or bias of spring 72 seeking to return the cylinder clockwise to latch detenting position, FIGURE 5. Once striker 42 has moved inwardly to rotate shoulder 46 of the bolt sufficiently clear of slot 66, the bias of spring 72 quickly returns cylinder 50 to its latch detenting position engaging the cylindrical detenting surface portion of cylinder portion 52 over the bolt shoulder to hold the same in the latched position of FIGURE 2. The parts are thus again ready for finger rotation in one direction on cylinder 50 against the action of spring 72 to release bolt 40 and open the door 16, or for insertion of the coded key and rotation in the opposite direction against spring 72 to the locked position of the cylinder.

Having thus described the invention, what is claimed is:

1. A vehicle body compartment closure latch and key-operable lock for a closure member movable between open and closed positions relative to a body compartment member, comprising, a latch bolt mounted on one of said members for rotation in a path between latched and unlatched positions, keeper means on the other of said members engageable by said latch bolt in the closed position of said closure member, a latch operating and locking member including therein key-operable locking means, means mounting said operating and locking member on said one member adjacent said latch bolt for rotation between latch detenting and latch releasing positions in planes generally normal to the plane of rotation of said latch bolt, said operating and locking member including a detenting portion disposed in said detenting position within the path of rotation of said latch bolt such as to be engageable with said latch bolt and hold the same in the latched position thereof and further including a bolt-releasing portion located angularly adjacent said detenting portion and operable to permit free rotation of said latch bolt between latched and unlatched positions, rotation of said operating and locking member from said latch detenting position to said latch releasing position thereof, registering said latch releasing portion thereof with said latch bolt for rotation of the latter between the latched and unlatched positions thereof, said key-operable locking means of said operating and locking member being cooperable with said one member for selectively locking said operating and locking member against rotation to said latch releasing position thereof, and means biasing said operating and locking member to said latch detenting position thereof.

2. A vehicle body compartment closure latch and key-operable lock for a closure member movable between open and closed positions relative to a body compartment member, comprising, a latch housing mounted on one of said members and having a generally cylindrical bore therein, a forked latch bolt mounted on said housing for rotation in a path between latched and unlatched positions and including a detenting shoulder portion, keeper means mounted on the other of said members and engageable by said latch bolt upon movement of said closure member from the open to the closed position thereof, a latch operating lock cylinder mounted in said housing bore for rotation in planes generally normal the plane of rotation of said latch bolt, said lock cylinder including a detenting portion adapted to lie within the path of rotation of said latch bolt and further including a recessed bolt-releasing portion angularly adjacent said detenting portion and recessed from the latter to an extent adapted to accommodate movement of said latch bolt between latched and unlatched positions, said lock cylinder member being rotatable in said housing between a latch detenting position registering said detenting portion in engagement with said shoulder portion of said latch bolt in the latched position of the latter to hold said latch bolt therein and a latch releasing position registering said recessed portion with the plane of rotation of said latch bolt to permit rotation of the latter between the latched and unlatched positions thereof, means biasing said operating and locking cylinder to said latch detenting position thereof, and key-operable locking means within said lock cylinder cooperable with said housing for selectively locking said lock cylinder against rotation to said latch releasing position thereof.

3. A vehicle body compartment closure latch and key-operable lock for a closure member movable between open and closed positions relative to a body compartment member, comprising, a latch housing mounted on one of said members and having a cylindrical bore therein, a forked latch bolt rotatably mounted on said housing for rotation between latched and unlatched positions and including a detenting shoulder portion, keeper means on the other of said members engageable by said latch bolt upon movement of said closure member from the open to the closed positions thereof, a latch operating lock cylinder rotatably mounted within said housing bore for rotation in planes generally normal to the plane of rotation of said latch bolt, said lock cylinder including a generally cylindrically surfaced detenting portion disposed adjacent said latch bolt and adapted to lie within the path of rotation of said shoulder portion thereof between latched and unlatched positions, said detenting portion including a slot recessed from the cylindrical surface thereof, said lock cylinder being rotatable between a latch detenting position registering said detenting portion thereof in engagement with said latch bolt shoulder portion in the latched position of said latch bolt to hold the same therein and a releasing position registering said slot with the plane of rotation of said latch bolt to permit rotation of the latter between the latched and unlatched positions thereof, key-operable tumbler means within said lock cylinder for selectively locking the latter to said housing against rotation to said latch releasing position thereof, and coil torsion spring means engaged between said housing and said lock cylinder operative to bias the latter to said latch detenting position thereof.

4. The closure latch and lock recited in claim 3 wherein said lock cylinder rotates in one direction from said latch detenting to said latch releasing positions thereof and in an opposite direction from said latch detenting position thereof to a locking position wherein said tumbler means are selectively operable to rotatively lock said operating and locking cylinder to said housing, and means mounting said coil torsion spring means between said housing and said lock cylinder in a manner to cause bias on the latter to its said latch detenting position from either said latch releasing position thereof or said locking position thereof.

References Cited

UNITED STATES PATENTS

| 1,789,775 | 1/1931 | Russ et al. | 70—146 |
| 2,511,253 | 6/1950 | Fischer | 292—129 |
| 3,003,348 | 10/1961 | Jacob | 70—84 |
| 3,378,289 | 4/1968 | Beckman et al. | 292—31 |

MARVIN A. CHAMPION, *Primary Examiner.*

R. L. WOLFE, *Assistant Examiner.*

U.S. Cl. X.R.

70—142, 237; 292—210, 216